United States Patent Office 3,139,424
Patented June 30, 1964

3,139,424
6-HALO-Δ³,⁵-PREGNADIENES AND
PROCESS THEREFOR
John A. Zderic, Palo Alto, Calif., and Otto Halpern and
José Iriarte, Mexico City, Mexico, assignors, by mesne
assignments, to Syntex Corporation, a corporation of
Panama
No Drawing. Filed Jan. 17, 1962, Ser. No. 166,950
19 Claims. (Cl. 260—239.55)

The present invention relates to novel cyclopentanophenanthrene derivatives and to a process for the production thereof.

More particularly the present invention relates to novel 6-fluoro and chloro-Δ³,⁵-pregnadiene derivatives.

The novel compounds of the present invention which are progestational agents with anti-estrogenic, anti-gonadotrophic and anti-ovulatory properties are represented by the following formula:

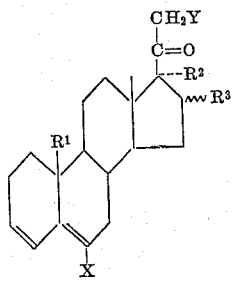

In the above formula Y represents hydrogen or fluorine; X represents fluorine or chlorine; $R^1$ represents hydrogen or methyl; $R^2$ represents hydrogen, hydroxyl or a hydrocarbon carboxylic acyloxy group of less than 12 carbon atoms; $R^3$ represents hydrogen, α-methyl, β-methyl, α-hydroxy or α-acyloxy; and, in addition, $R^2$ and $R^3$ together may represent the group:

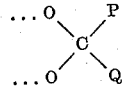

wherein P represents a lower alkyl group and Q represents a lower alkyl, or an aryl or aralkyl group, each containing up to 8 carbon atoms.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified by the following equation:

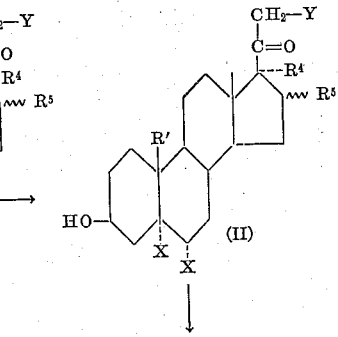

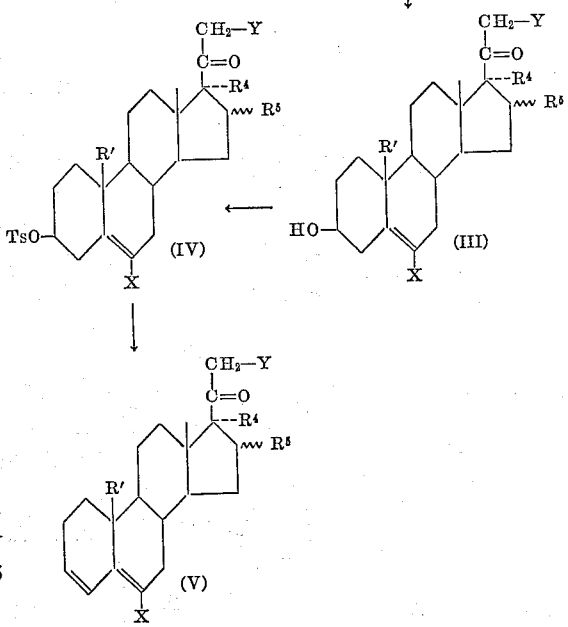

In the above formulas Y, X and $R^1$ have the same meaning as previously described, $R^4$ may be hydrogen or a hydrocarbon carboxylic acyloxy group of less than 12 carbon atoms; $R^5$ represents hydrogen, α-methyl, β-methyl or α-acyloxy; in addition $R^4$ and $R^5$ together may represent the group

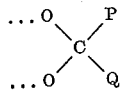

wherein P and Q have the same meaning as previously set forth.

In practicing the process outlined above, the starting compound, which is a Δ⁵-pregnen-3β-ol-20-one derivative (I), is treated with phenyl iodoso dichloride or difluoride to give the corresponding 5α,6α-dichloro or difluoro derivative (II). This derivative upon treatment in a basic medium such as calcium carbonate in dimethylformamide is dehydrohalogenated to the corresponding 6-fluoro or chloro-Δ⁵-pregnene compound (III). Conventional treatment of the latter derivative with a lower hydrocarbon sulfonic acid halide, preferably p-toluenesulfonic acid chloride in pyridine yields the respective 3-tosylate (IV) which upon treatment with a detosylating agent, preferably sodium acetate in acetic acid, affords the corresponding 6-halo-Δ³,⁵-pregnene-20-one derivative (V).

The compounds obtained by the above described procedures, which have a 17α-acyloxy group present in the molecule, yield the corresponding 17α-free hydroxyl derivative by conventional saponification, preferably with an alkali metal hydroxide.

The final compounds of the present invention having a ketonide at the 16,17-positions produce the 16α,17α-diols by hydrolysis with a strong acid, preferably formic acid.

The free alcohols thus obtained, are conventionally acylated with an excess of an acylating agent, as for example an anhydride derived from a hydrocarbon carboxylic acid of the type described hereinbefore in the presence of p-toluenesulfonic acid, thus affording correspondingly the 17α-monoacylates or the 16α,17α-diacylates. The latter compounds, upon selective saponification in a mild alkaline medium yield the corresponding 16α-hydroxy-17α-acyloxy derivative which by further acylation gives the respective 16,17-diesters with the same

| Starting Compounds | Products |
|---|---|
| 6-chloro-17α-acetoxy-16α-methyl-Δ⁵-pregnan-3β-ol-20-one. | 6-chloro-17α-acetoxy-16α-methyl-Δ³,⁵-pregnadien-20-one. |
| 6-chloro-17α-acetoxy-16β-methyl-Δ⁵-pregnen-3β-ol-20-one. | 6-chloro-17α-acetoxy-16β-methyl-Δ³,⁵-pregnadien-20-one. |
| 6-chloro-17α-acetoxy-Δ⁵-pregnen-3β-ol-20-one. | 6-chloro-17α-acetoxy-Δ³,⁵-pregnadien-20-one. |
| 6-chloro-16α-methyl-Δ⁵-pregnen-3β-ol-20-one. | 6-chloro-16α-methyl-Δ³,⁵-pregnadien-20-one. |
| 6-chloro-16β-methyl-3β-ol-20-one. | 6-chloro-16β-methyl-Δ³,⁵-pregnadien-20-one. |
| 6-chloro-19-nor-Δ⁵-pregnen-3β-ol-20-one. | 6-chloro-19-nor-Δ³,⁵-pregnadien-20-one. |
| 6-chloro-Δ⁵-pregnen-3β, 16α, 17α-triol-20-one-16, 17-acetonide. | 6-chloro-Δ³,⁵-pregnadien-16α, 17α-diol-20-one-16, 17-acetonide. |
| 6-chloro-Δ⁵-pregnen-3β, 16α, 17α-triol-20-one-16, 17-acetophenonide. | 6-chloro-Δ³,⁵-pregnadien-16α, 17α-diol-20-one-16, 17-acetophenonide. |
| 6-chloro-21-fluoro-Δ⁵-pregnen-3β-ol-20-one. | 6-chloro-21-fluoro-Δ³,⁵-pregnadien-20-one. |
| 6-fluoro-17α-acetoxy-16α-methyl-Δ⁵-pregnen-3β-ol-20-one. | 6-fluoro-17α-acetoxy-16α-methyl-Δ³,⁵-pregnadien-20-one. |
| 6-fluoro-17α-acetoxy-16β-methyl-Δ⁵-pregnen-3β-ol-20-one. | 6-fluoro-17α-acetoxy-16β-methyl-Δ³,⁵-pregnadien-20-one. |
| 6-fluoro-17α-acetoxy-Δ⁵-pregnen-3β-ol-20-one. | 6-fluoro-17α-acetoxy-Δ³,⁵-pregnadien-20-one. |
| 6-fluoro-16α-methyl-Δ⁵-pregnen-3β-ol-20-one. | 6-fluoro-16α-methyl-Δ³,⁵-pregnadien-20-one. |
| 6-fluoro-16β-methyl-Δ⁵-pregnen-3β-ol-20-one. | 6-fluoro-16β-methyl-Δ³,⁵-pregnadien-20-one. |
| 6-fluoro-19-nor-Δ⁵-pregnen-3β-ol-20-one. | 6-fluoro-19-nor-Δ³,⁵-pregnadien-20-one. |
| 6-fluoro-Δ⁵-pregnen-3β, 16α, 17α-triol-20-one-16, 17-acetonide. | 6-fluoro-Δ³,⁵-pregnadien-16α, 17α-diol-20-one-16, 17-acetonide. |
| 6-fluoro-Δ⁵-pregnen-3β, 16α, 17α-triol-20-one-16, 17-acetophenonide. | 6-fluoro-Δ³,⁵-pregnadien-16α, 17α-diol-20-one-16, 17-acetophenonide. |
| 6, 21-difluoro-Δ⁵-pregnen-3β-ol-20-one. | 6, 21-difluoro-Δ³,⁵-pregnadien-20-one. |
| 6, 21-difluoro-16α-methyl-Δ⁵-pregnen-3β-ol-20-one. | 6, 21-difluoro-16α-methyl-Δ³,⁵-pregnadien-20-one. |

*Example V*

A solution of 0.17 g. of potassium hydroxide in 0.2 cc. of water and 2.5 cc. of methanol was added over 30 minutes to a boiling solution of 1 g. of 6-chloro-17α-acetoxy-16α-methyl-Δ³,⁵-pregnadien-20-one in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 6-chloro-16α-methyl-Δ³,⁵-pregnadien-17α-ol-20-one.

Upon treament by the same technique, the starting compounds under I, afforded the products under II.

| I | II |
|---|---|
| 6-chloro-17α-acetoxy-16β-methyl-Δ³,⁵-pregnadien-20-one. | 6-chloro-16β-methyl-Δ³,⁵-pregnadien-17α-ol-20-one. |
| 6-chloro-17α-acetoxy-Δ³,⁵-pregnadien-20-one. | 6-chloro-Δ³,⁵-pregnadien-17α-ol-20-one. |
| 6-fluoro-17α-acetoxy-16α-methyl-Δ³,⁵-pregnadien-20-one. | 6-fluoro-16α-methyl-Δ³,⁵-pregnadien-17α-ol-20-one. |
| 6-fluoro-17α-acetoxy-16β-methyl-Δ³,⁵-pregnadien-20-one. | 6-fluoro-16β-methyl-Δ³,⁵-pregnadien-17α-ol-20-one. |
| 6-fluoro-17α-acetoxy-Δ³,⁵-pregnadien-20-one. | 6-fluoro-Δ³,⁵-pregnadien-17α-ol-20-one. |

*Example VI*

To a solution of 5 g. of 6-chloro-16α-methyl-Δ³,⁵-pregnadien-17α-ol-20-one, obtained in accordance with the preceding example, in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the 17-caproate of 6-chloro-16α-methyl-Δ³,⁵-pregnadien-17α-ol-20-one.

By the same technique were treated the 17α-alcohols obtained in the foregoing example, thus furnishing correspondingly: 6-chloro-16β-methyl-Δ³,⁵-pregnadiene-17α-ol-20-one-caproate, 6-chloro-Δ³,⁵-pregnadien-17α-ol-20-one-caproate, 6-fluoro-16α-methyl-Δ³,⁵-pregnadien-17α-ol-20-one-caproate, 6-fluoro-16β-methyl-Δ³,⁵-pregnadien-17α-ol-20-one-caproate and 6-fluoro-Δ³,⁵-pregnadien-17α-ol-20-one-caproate.

*Example VII*

1 g. of 6-chloro-Δ³,⁵-pregnadien-16α,17α-diol-20-one-16,17-acetonide was heated on the steam bath with 20 cc. of 60% formic acid for 1 hour, cooled, diluted with water and the precipitate was collected, washed with water, dried, and recrystallized from acetone-hexane, thus affording 6-chloro-Δ³,⁵-pregnadien-16α,17α-diol-20-one.

6-fluoro-Δ³,⁵-pregnadien - 16α,17α - diol-20-one-16,17-acetophenonide was treated by the preceding technique yielding 6-fluoro-Δ³,⁵-pregnadien-16α,17α-diol-20-one.

*Example VIII*

Following the procedure described in Example VI were treated 6-chloro-Δ³,⁵-pregnadien-16α,17α-diol-20-one and 6-fluoro-Δ³,⁵-pregnadien-16α,17α-diol-20-one, yielding correspondingly 6-chloro-Δ³,⁵-pregnadien - 16α,17α - diol-20-one, 16,17-dicaproate and 6-fluoro-Δ³,⁵-pregnadien-16α, 17α-diol-20-one, 16,17-dicaproate.

*Example IX*

Following the same procedure of the preceding example, but substituting caproic anhydride by propionic anhydride, there were obtained 6-chloro-Δ³,⁵-pregnadien-16α,17α-diol-20-one, 16,17-dipropionate and 6-fluoro-Δ³,⁵-pregnadien-16α,17α-diol-20-one, 16,17-dipropionate.

*Example X*

A mixture of 1 g. of 6-chloro-Δ³,⁵-pregnadien-16α,17α-diol-20-one, 4 cc. of pyridine and 2 cc. of acetic anhydride was kept at room temperature overnight, poured into ice water, the formed precipitate was filtered, washed with water and dried. Crystallization from acetone-hexane gave 6-chloro-Δ³,⁵-pregnadien - 16α,17α - diol - 20-one-16-monoacetate.

*Example XI*

The foregoing compound was treated following the procedure described in Example VI, thus yielding 6-chloro-Δ³,⁵-pregnadien - 16α,17α - diol - 20-one-16-acetate-17-caproate.

*Example XII*

2 g. of 6-chloro-Δ³,⁵-pregnadien-16α,17α-diol-20-one-16,17-dipropionate were dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 6-chloro-Δ³,⁵-pregnadien-16α,17α-diol-20-one-17-propionate.

*Example XIII*

The foregoing compound was acetylated following the technique described in Example X, thus yielding 6-chloro-Δ³,⁵-pregnadien - 16α,17α - diol-20-one-16-acetate-17-propionate.

*Example XIV*

A culture of *Streptomyces roseochromogenus* ATCC 3347 was prepared in an inclined agar medium containing 1% of glucose and 1% of yeast extract. 1 cc. of a suspension of this culture was then used to inoculate each one of a series of 250 cc. flasks containing 50 cc. of a sterilized aqueous medium of 2% peptone and 5% corn syrup, the mixtures were then incubated in a shaking machine at 28° C. under aeration for a period of 24–48 hours. There was thus obtained a vegetating growing culture of *Streptomyces roseochromogenus* which was used for the subsequent incubation of the steroid.

10 mg. of 19-nor-$\Delta^5$-pregnen-3$\beta$-ol-20-one-acetate (obtained by conventional acetylation of the free 3$\beta$-alcohol) were added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving 19-nor-$\Delta^5$-pregnene-3$\beta$,16$\alpha$-diol-20-one-3-acetate.

A solution of 8 g. of the latter steroid in 100 cc. of chloroform containing a few drops of pyridine was cooled to 0° C. and slowly treated under stirring with a cooled solution of chlorine in chloroform containing 1.05 molar equivalents of chlorine. The mixture was allowed to reach room temperature, the excess of chlorine was removed by flushing with dry air and the solution was washed with 5% aqueous sodium bicarbonate solution and subsequently with water, dried over anhydrous sodium sulfate and evaporated to dryness. Crystallization of the residue from methanol-benzene afforded 5$\alpha$,6$\beta$-dichloro-19-nor-pregnane-3$\beta$,16$\alpha$-diol-20-one-3-acetate.

A solution of 5 g. of the latter 5$\alpha$,6$\beta$-dichloro compound in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 5$\alpha$,6$\beta$-dichloro-19-nor-pregnane-3$\beta$,16$\alpha$-diol-20-one-3-acetate-16-tosylate.

The total crude compound was kept at 50° C. with 5 g. of anhydrous sodium acetate and 160 cc. of ethanol during 2.5 hours. Chloroform and water were added. The aqueous layer was extracted several times with chloroform and the combined organic extracts were washed with concentrated sodium bicarbonate solution, then with water, dried over sodium sulfate and evaporated to dryness. Chromatography and recrystallization of the solid fractions from acetone-hexane afforded 5$\alpha$,6$\beta$-dichloro-19-nor-$\Delta^{16}$-pregnen-3$\beta$-ol-20-one-acetate.

50 cc. of dioxane containing 3 g. of the latter steroid and 3.46 cc. of pyridine were allowed to stand at room temperature for 6 days with 2.0 g. of osmium tetroxide. The mixture was then saturated with hydrogen sulfide and filtered through a pad of filter aid. The resultant colored filtrate was evaporated to dryness and taken up in 50 ml. of methanol. By stirring for 20 minutes with 10 g. of neutral alumina and 2 g. of decolorizing carbon and then filtering, the solution was almost completely decolorized and gave upon evaporation to dryness the crude material which was purified by chromatography on florisil. Recrystallization of the solid fractions from acetone-ether gave 5$\alpha$,6$\beta$-dichloro-19-nor-pregnane-3$\beta$,16$\alpha$,17$\alpha$-triol-20-one-3-acetate.

To 120 cc. of acetone containing 1 g. of the last named triol were added 30 drops of 78% perchloric acid. After 1 hour at room temperature 30 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness. The residue upon trituration with methanol gave a crude 16,17-acetonide. Recrystallizations from the same solvent furnished 16$\alpha$,17$\alpha$-isopropylidendioxy-5$\alpha$,6$\beta$-dichloro-19-nor-pregnan-3$\beta$-ol-20-one-acetate.

A suspension of 1 g. of the latter steroid in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone hexane to yield 16$\alpha$,17$\alpha$-isopropylidendioxy - 5$\alpha$,6$\beta$ - dichloro-19-nor-pregnan-3$\beta$-ol-20-one.

To a solution of 1 g. of the latter 5$\alpha$,6$\beta$-dichloro compound in 200 cc. of acetone, at room temperature and under a nitrogen atmosphere, there were added, 60 cc. of freshly prepared chromous chloride solution. After 5 minutes the acetone was removed under reduced pressure, water was added and the precipitate filtered off and dried. Recrystallization from acetone-hexane yielded 16$\alpha$,17$\alpha$-isopropylidendioxy - 18 - nor-$\Delta^5$-pregnen-3$\beta$-ol-20-one.

The latter steroid was treated in accordance with Examples I and II yielding respectively 16$\alpha$,17$\alpha$-isopropylidendioxy-5$\alpha$,6$\alpha$-dichloro-19-nor-pregnan-3$\beta$-ol - 20 - one and 16$\alpha$,17$\alpha$-isopropylidendioxy-5$\alpha$,6$\alpha$-difluoro - 19 - nor-pregnan-3$\beta$-ol-20-one.

*Example XV*

16$\alpha$,17$\alpha$-isopropylidendioxy - 5$\alpha$,6$\alpha$ - dichloro-19-nor-pregnan-3$\beta$-ol-20-one was successively treated in accordance with Examples III, IV and VII, affording respectively: 16$\alpha$,17$\alpha$-isopropylidendioxy - 6 - chloro-19-nor-$\Delta^5$-pregnen-3$\beta$-ol-20-one, 16$\alpha$,17$\alpha$, - isopropylidendioxy-6-chloro-19-nor-$\Delta^{3,5}$-pregnadien - 20 - one and 6-chloro-19-nor-$\Delta^{3,5}$-pregnadiene-16$\alpha$,17$\alpha$-diol-20-one.

*Example XVI*

16$\alpha$,17$\alpha$-isopropylidendioxy - 5$\alpha$,6$\alpha$ - difluoro-19-nor-pregnan-3$\beta$-ol-20-one was consecutively treated in accordance with Examples III, IV and VII, furnishing respectively: 16$\alpha$,17$\alpha$-isopropylidendioxy - 6 - fluoro-19-nor-$\Delta^5$-pregnen-3$\beta$-ol-20-one, 16$\alpha$,17$\alpha$ - isopropylidendioxy-6-fluoro-19-nor-$\Delta^{3,5}$-pregnadien-20-one and 6-fluoro-19-nor-$\Delta^{3,5}$-pregnadiene-16$\alpha$,17$\alpha$-diol-20-one.

*Example XVII*

5$\alpha$,6$\beta$-dichloro - 19 - nor-$\Delta^{16}$-pregnen-3$\beta$-ol-20-one-acetate, was successively saponified with potassium carbonate and treated with chromous chloride solution, following the procedures described in Example XIV, thus furnishing as final product 19-nor-$\Delta^{5,16}$-pregnadien-3$\beta$-ol-20-one.

To a mixture of 1 g. of 19-nor-$\Delta^{5,16}$-pregnadien-3$\beta$-ol-20-one, 1 g. of cuprous chloride and 30 cc. of anhydrous tetrahydrofuran was added, while stirring and cooling, 50 cc. of tetrahydrofuran, containing 5 mol. equiv. of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by crystallization from methylene chloride-hexane to afford 16$\alpha$-methyl-19-nor-$\Delta^5$-pregnen-3$\beta$-ol-20-one.

The latter compound was treated in accordance with Examples I and II, yielding respectively 5$\alpha$,6$\alpha$-dichloro-16$\alpha$-methyl-19-nor-pregnan-3$\beta$-ol-20-one and 5$\alpha$,6$\alpha$-difluoro-16$\alpha$-methyl-19-nor-pregnan-3$\beta$-ol-20-one.

*Example XVIII*

5$\alpha$,6$\alpha$ - dichloro - 16$\alpha$ - methyl-19-nor-pregnan-3$\beta$-ol-20-one was successively treated in accordance with Examples III and IV, thus respectively giving: 6-chloro-16$\alpha$-methyl-19-nor-$\Delta^5$-pregnen-3$\beta$-ol-20-one and 6-chloro-16$\alpha$-methyl-19-nor-$\Delta^{3,5}$-pregnadien-20-one.

*Example XIX*

5$\alpha$,6$\alpha$-difluoro-16$\alpha$-methyl-19-nor-pregnan-3$\beta$-ol-20-one was successively treated in accordance with Examples III and IV, thus respectively giving: 6-fluoro-16$\alpha$-methyl-19-nor-$\Delta^5$-pregnen-3$\beta$-ol-20-one and 6-fluoro-16$\alpha$-methyl-19-nor-$\Delta^{3,5}$-pregnadien-20-one.

We claim:
1. A compound of the following formula:

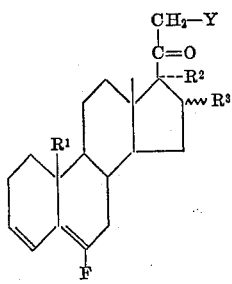

wherein Y is selected from the group consisting of hydrogen and fluorine, $R^1$ is a member of the group consisting of hydrogen and methyl; $R^2$ is selected from the group consisting of hydrogen, hydroxyl and a hydrocarbon carboxylic acyloxy group of less than 12 carbon atoms; $R^3$ is a member of the group consisting of hydrogen, α-methyl, β-methyl, α-hydroxyl and an α-acyloxy group derived from α-hydrocarbon carboxylic acid of less than 12 carbon atoms, and $R^2$ and $R^3$ together are in addition the group

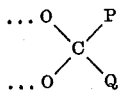

wherein P is a lower alkyl group and Q is selected from the group consisting of a lower alkyl, an aryl and an aralkyl group, each containing up to 8 carbon atoms.

2. A compound of the following formula:

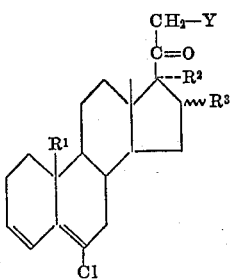

wherein Y is selected from the group consisting of hydrogen and fluorine; R' is a member of the group consisting of hydrogen and methyl; $R^2$ is selected from the group consisting of hydrogen, hydroxyl and a hydrocarbon carboxylic acyloxy group of less than 12 carbon atoms; $R^3$ is a member of the group consisting of hydrogen, α-methyl, β-methyl, α-hydroxyl and an α-acyloxy group derived from a hydrocarbon carboxylic acid of less than 12 carbon atoms, and $R^2$ and $R^3$ together are in addition, the group

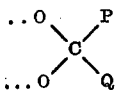

wherein P is a lower alkyl group and Q is selected from the group consisting of a lower alkyl, an aryl and an aralkyl group, each containing up to 8 carbon atoms.

3. 6-chloro-17α-acetoxy-16α-methyl-$\Delta^{3,5}$-pregnadien-20-one.
4. 6-chloro-17α-acetoxy-16β-methyl-$\Delta^{3,5}$-pregnadien-20-one.
5. 6-chloro-17α-acetoxy-$\Delta^{3,5}$-pregnadien-20-one.
6. 6-fluoro-17α-acetoxy-16α-methyl-$\Delta^{3,5}$-pregnadien-20-one.
7. 6-fluoro-17α-acetoxy-16β-methyl-$\Delta^{3,5}$-pregnadien-20-one.
8. 6-fluoro-17α-acetoxy-$\Delta^{3,5}$-pregnadien-20-one.
9. 6-fluoro-19-nor-$\Delta^{3,5}$-pregnadien-20-one.
10. 6-chloro-19-nor-$\Delta^{3,5}$-pregnadien-20-one.
11. 6-chloro-$\Delta^{3,5}$-pregnadien-16α,17α-diol-20-one-16,17-acetophenonide.
12. 6-fluoro-$\Delta^{3,5}$-pregnadien-16α,17α-diol-20-one-16,17-acetophenonide.
13. 6-chloro-21-fluoro-16α-methyl-$\Delta^{3,5}$-pregnadien-20-one.
14. 6-chloro-21-fluoro-$\Delta^{3,5}$-pregnadien-20-one.
15. 6,21-difluoro-16α-methyl-$\Delta^{3,5}$-pregnadien-20-one.
16. 6,21-difluoro-$\Delta^{3,5}$-pregnadien-20-one.
17. A process for the production of compounds selected from the group consisting of 6-fluoro and 6-chloro-$\Delta^{3,5}$-pregnadiene derivatives which comprises treating the corresponding 3β-hydroxy-$\Delta^5$-pregnene compound with the corresponding phenyl iodosodihalide, dehydrating the resultant 3β-hydroxy-5α,6α-dihalo pregnane with a metal carbonate in a liquid amide treating the formed 3β-hydroxy-6-halo-$\Delta^5$-pregnene with a lower hydrocarbon sulfonic acid chloride in a tertiary amine and reacting the formed 3β-sulfonate with an alkali metal lower hydrocarbon carboxylic acylate in a lower hydrocarbon carboxylic acid.
18. The process of claim 17 wherein the final compound is a 6-fluoro-$\Delta^{3,5}$-pregnadiene derivative, the phenyl iodoso dihalide is the difluoride, the metal carbonate is calcium carbonate, the liquid amide is dimethyl formamide the lower sulfonic acid chloride is p-toluene-sulfonic acid chloride, the tertiary amine is pyridine, the alkali metal lower hydrocarbon carboxylic acid is acetic acid.
19. The process of claim 17 wherein the final compound is a 6-chloro-$\Delta^{3,5}$-pregnadiene derivative, the phenyl iodoso dihalide is the dichloride, the metal carbonate is calcium carbonate, the liquid amide is dimethyl formamide, the lower hydrocarbon sulfonic acid chloride is p-toluenesulfonic acid chloride, the tertiary amine is pyridine, the alkali metal lower hydrocarbon carboxylic acylate is sodium acetate, and the lower hydrocarbon carboxylic acid is acetic acid.

References Cited in the file of this patent
Romo et al.: J.A.C.S. 73, 1951, pp. 1528–1533.
Ringold et al.: J.A.C.S. 81, 1959, pp. 3495 and 3486.